C. UHL.
HOISTING MACHINE.
APPLICATION FILED SEPT. 7, 1918.

1,382,576.

Patented June 21, 1921.

Clyde Uhl
INVENTOR

BY Victor J. Evans
ATTORNEY

WITNESSES

UNITED STATES PATENT OFFICE.

CLYDE UHL, OF BARTLESVILLE, OKLAHOMA.

HOISTING-MACHINE.

1,382,576.   Specification of Letters Patent.   Patented June 21, 1921.

Application filed September 7, 1918. Serial No. 253,053.

*To all whom it may concern:*

Be it known that I, CLYDE UHL, a citizen of the United States, residing at Bartlesville, in the county of Washington and State of Oklahoma, have invented new and useful Improvements in Hoisting-Machines, of which the following is a specification.

This invention relates to hoisting machines, the object in view being to produce a hoisting machine which is especially adapted for well driving work, for hoisting and lowering well casings, tubes and rods. While the apparatus hereinafter described is particularly adapted for the purpose referred to, it will become apparent as the description proceeds that the improved hoisting machine may be used for various other purposes which will suggest themselves.

With the above and other objects in view, the invention consists in the construction, combination and arrangement of parts, as herein described, illustrated and claimed.

Figure 1:
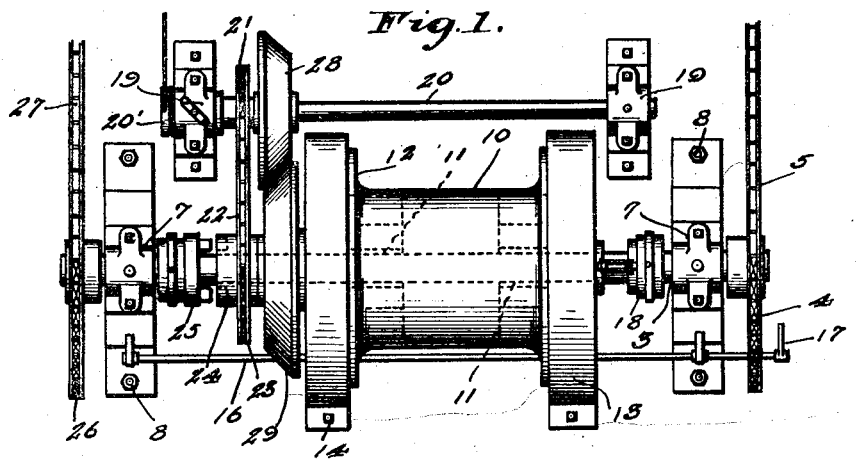
Figure 1 is a top plan view of the hoisting machine.
Figure 2:
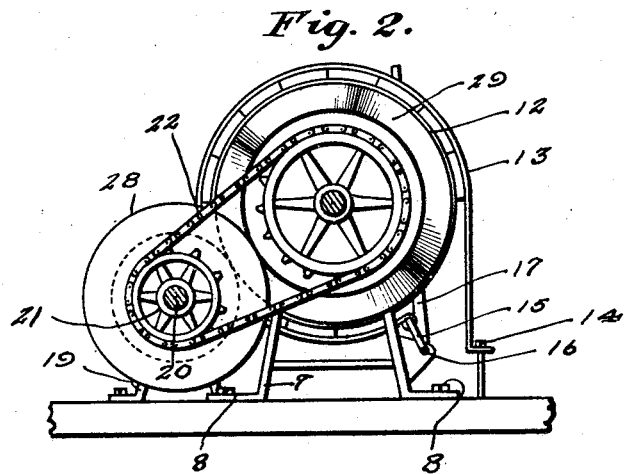
Fig. 2 is an end view of the same.

Referring to the drawings, 1 designates the frame of a motor truck, 1' the engine thereof, 2 the driving shaft of the truck, and 3 the driving shaft of the hoisting mechanism, said shaft having fast thereon a sprocket gear 4 from which a chain 5 extends around a smaller sprocket gear 6 on the driving shaft 2 of the truck.

The shaft 3 is mounted adjacent to its opposite ends in suitable bearing members 7 secured by fastening means 8 to the platform or body 1 of the truck. Normally loose upon the shaft 3 is a main drum 10, roller bearings 11 being interposed between said drum and the shaft 3 so as to reduce friction to a minimum. The drum 10 is provided at the opposite ends thereof with brake drums 12 in conjunction with which are used brake bands 13, each of which is secured by fastening means 14 to the truck frame and the free end of which is attached to a crank 15 of a horizontal brake shaft 16 having fast thereon an operating lever 17. 18 designates a sliding clutch on the shaft 3 for throwing the main drum 10 into and out of engagement therewith.

Figure 3:
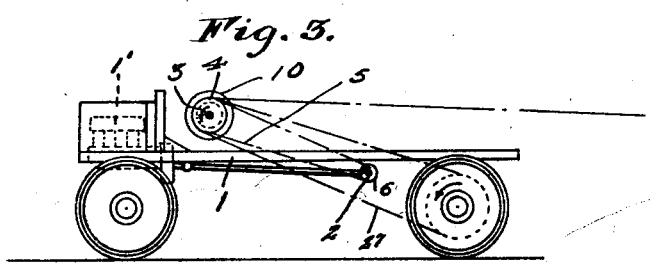
Fig. 3 is a diagrammatic reduced side elevation showing the hoisting machine mounted upon a wheeled motor truck.

Mounted in bearings 19 in parallel relation to the shaft 3 is a countershaft 20 having fast thereon a sprocket gear 21 from which a chain 22 extends around a sprocket wheel 23 on the shaft 3. The gear 23 is loose on shaft 3 and has a clutch face 24 adapted to be engaged by a clutch member 25 feathered to and slidable on the shaft 3. The shaft 3 has fast thereon a sprocket gear 26. From the sprocket gear 26 a chain 27 extends around another sprocket gear on the shaft or driving element 2 of the truck, Fig. 3. Either the chain 5 or the chain 27 may be employed to drive the shaft 3; the chain 27 being employed when the rear truck wheel is raised clear of the ground. Fast on the counter shaft 20 is a bevel faced friction gear 28 movable into and out of driving engagement with a correspondingly shaped friction wheel 29 on the main drum 10. An end thrust device 20' is used to shift the shaft 20 and to press the gear 28 against the gear 29. The mechanism just described provides for reversing the direction of rotation of the main drum 10 to give the necessary slack in the hoist or cable wound thereon, this being especially useful in connection with the work platform in driving wells. It will be observed that the main drum 10 may thus be driven in either direction as the nature of the work requires.

It will be apparent from the foregoing that the shaft 3 is driven from the shaft 2, and the rear wheels are driven, in turn, from the shaft 3 through sprocket 26.

I claim:—

In a hoisting apparatus, a wheeled truck having a platform and also having a driving element, a hoisting organization mounted on the said platform and including a main drive shaft, a drum loose on said shaft, a driving connection intermediate the said driving element of the truck and the shaft, a driving connection intermediate of one of the ground wheels of the truck and said shaft, a clutch to connect the drum directly to the shaft, a bevel-face friction gear fixed to the drum, a counter shaft, a bevel-face friction gear fixed on the counter shaft and contacting with the first-named bevel-face friction gear, a clutch member loose on the first-named shaft and connected with the counter shaft, and a clutch member feathered on the first-named shaft and movable into and out of engagement with said loose clutch member.

In testimony whereof I affix my signature.

CLYDE UHL.